(12) United States Patent
Blomquist

(10) Patent No.: US 6,778,753 B2
(45) Date of Patent: Aug. 17, 2004

(54) HALOGENATED OPTICAL POLYMER COMPOSITION

(75) Inventor: Robert M. Blomquist, Whippany, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 254 days.

(21) Appl. No.: 09/912,827

(22) Filed: Jul. 25, 2001

(65) Prior Publication Data

US 2003/0055120 A1 Mar. 20, 2003

(51) Int. Cl.$^7$ ................................................. G02B 6/00
(52) U.S. Cl. ....................... 385/143; 385/141; 385/142; 385/144; 385/145; 385/129
(58) Field of Search ................................ 385/141, 142, 385/143, 144, 145, 129, 130, 131, 132

(56) References Cited

U.S. PATENT DOCUMENTS

| | | | |
|---|---|---|---|
| 4,511,209 A | | 4/1985 | Skutnik |
| 4,942,112 A | | 7/1990 | Monroe et al. |
| 4,983,479 A | | 1/1991 | Broer et al. |
| 5,054,872 A | | 10/1991 | Fan et al. |
| 5,062,680 A | | 11/1991 | Imamura et al. |
| 5,093,888 A | * | 3/1992 | Takezawa et al. ........... 385/141 |
| 5,391,587 A | | 2/1995 | Wu |
| 5,402,514 A | | 3/1995 | Booth et al. |
| 5,822,489 A | | 10/1998 | Hale |
| 5,827,611 A | | 10/1998 | Forbes |
| 6,160,074 A | | 12/2000 | Matsuda et al. |
| 6,306,563 B1 | | 10/2001 | Xu et al. |

FOREIGN PATENT DOCUMENTS

| | | |
|---|---|---|
| WO | WO 98/46556 | 10/1998 |
| WO | WO 00/64964 | 11/2000 |
| WO | WO 00/78819 | 12/2000 |

OTHER PUBLICATIONS

Tonelli, Claudio et al. "Linear perfluoropolyether difunctional oligomers: chemistry, properties and applications", Journal of Fluorine Chemistry 95 (1999) pp. 51–70.

B. Ameduri, et al. "Synthesis and polymerization of fluorinated monomers bearing a reactive lateral group—Part 4. Preparation of functional perfluorovinyl monomers by radical addition of functional mercaptans to 1,1,2–trifluoro–1, 4–pentadiene", Journal of Fluorine Chemistry 92 (1998) pp. 77–84.

U.S. patent application Ser. No. 09/745076 filed Dec. 20, 2000.

U.S. patent application Ser. No. 09/747068 filed Dec. 21, 2000.

U.S. patent application Ser. No. 09/846697 filed May 1, 2001.

* cited by examiner

Primary Examiner—Hemang Sanghavi
Assistant Examiner—Sung Pak

(57) ABSTRACT

The invention provides polymeric optical materials that can be cured in air and have low optical loss in both the C-band and the L-band of the telecommunications spectrum. The polymeric materials are made by the free radical polymerization of an at least difunctional thiol compound with an at least difunctional ethylenically unsaturated compound wherein at least one of the thiol compound and the ethylenically unsaturated compound is at least partially halogenated. The compositions of this invention may be used to fabricate planar optical waveguides with low loss and low birefringence.

10 Claims, 2 Drawing Sheets

HALOGENATED OPTICAL POLYMER COMPOSITION

BACKGROUND OF THE INVENTION

1. Field of the Invention

The present invention relates generally to polymeric materials, and more specifically to halogenated polymeric materials useful in the construction of devices for telecommunications.

2. Technical Background

In optical communication systems, messages are transmitted by electromagnetic carrier waves at optical frequencies that are generated by such sources as lasers and light-emitting diodes. There is interest in such optical communication systems because they offer several advantages over conventional communication systems.

One preferred device for routing or guiding waves of optical frequencies from one point to another is an optical waveguide. The operation of an optical waveguide is based on the fact that when a light-transmissive medium is surrounded or otherwise bounded by an outer medium having a lower refractive index, light introduced along the axis of the inner medium substantially parallel to the boundary with the outer medium is highly reflected at the boundary, trapping the light in the light transmissive medium and thus producing a guiding effect between channels. A wide variety of optical devices can be made which incorporate such light guiding structures as the light transmissive elements. Illustrative of such devices are planar optical slab waveguides, channel optical waveguides, rib waveguides, optical couplers, optical splitters, optical switches, optical filters, arrayed waveguide gratings, waveguide Bragg gratings, variable attenuators and the like. For light of a particular frequency, optical waveguides may support a single optical mode or multiple modes, depending on the dimensions of the inner light guiding region and the difference in refractive index between the inner medium and the surrounding outer medium.

Optical waveguide devices and other optical interconnect devices may be constructed from organic polymeric materials. Whereas single mode optical devices built from planar waveguides made from glass are relatively unaffected by temperature, devices made from organic polymers may show a significant variation of properties with temperature. This is due to the fact that organic polymeric materials have a relatively high thermo-optic coefficient (dn/dT). Thus, as an organic polymer undergoes a change in temperature, its refractive index changes appreciably. This property can be exploited to make active, thermally tunable or controllable devices incorporating light transmissive elements made from organic polymers. One example of a thermally tunable device is a 1×2 switching element activated by the thermo-optic effect. Thus, light from an input waveguide may be switched between two output waveguides by the application of a thermal gradient induced by a resistive heater. Typically, the heating/cooling processes occur over the span of one to several milliseconds.

Most polymeric materials, however, contain carbon-hydrogen bonds, which absorb strongly in the 1550 nm wavelength range that is commonly used in telecommunications applications, causing devices made from such materials to have unacceptably high insertion losses. By lowering the concentration of C—H bonds in a material by replacement of C—H bonds with C—D or C-halogen bonds, it is possible to lower the absorption loss at infrared wavelengths. While planar waveguides made from fluorinated polyimides and deuterated or fluorinated polymethacrylates have achieved single mode losses of as little as 0.10 dB/cm at 1300 nm, it is relatively difficult to make optical devices from these materials. For example, the processes by which these waveguides have typically been made includes the use of a reactive ion etching process, which is cumbersome and can cause high waveguide loss due to scattering. Further, deuteration is not an effective means of reducing loss in the 1550 nm wavelength range. Fluorinated polyimides and deuterated or fluorinated polymethacrylates have higher losses in the telecommunications window near 1550 nm, typically on the order of 0.6 dB/cm. O—H and N—H bonds also contribute strongly to loss at wavelengths near 1310 nm and 1550 nm. Compositions are sought in which the concentrations of O—H and N—H bonds are minimal.

Photopolymers have been of particular interest for optical interconnect applications because they can be patterned using standard photolithographic techniques. Photolithography involves the selective polymerization of a layer of the photopolymer by exposure of the material to a pattern of actinic radiation. Material that is exposed to the actinic radiation is polymerized, whereas material that is not exposed remains unpolymerized. The patterned layer is developed, for example, by removal of the unexposed, unpolymerized material by an appropriate solvent.

Among the many known photopolymers, acrylate materials have been widely studied as waveguide materials because of their optical clarity and low birefringence, and the ready availability of a wide range of monomers. However, the performance of optical devices made from many acrylate materials has been poor, due to high optical losses, poor resistance to aging and yellowing and thermal instability of the polymerized material. Further, acrylate materials have relatively high losses, up to 1 dB/cm, in the L-band (about 1565 nm to about 1620 nm), and do not cure efficiently in air, necessitating the use of oxygen-free conditions.

In the attachment of optical fibers to highly fluorinated, low refractive index polymer optical waveguides, a process known as pigtailing, highly fluorinated, low refractive index adhesives are desired. Most suitably, in order to reduce back reflections, the refractive index of the adhesive lies between that of the fluorinated polymer waveguide (about 1.33 to about 1.40) and the optical fiber (about 1.46). Materials that are known to UV cure in the presence of air, such as epoxies and vinyl ethers, generally have higher refractive indices (about 1.47 to about 1.52). Further, these materials are difficult to formulate with highly fluorinated monomers to reduce their refractive index due to the insolubility of the required cationic photoinitiators in nonpolar materials.

SUMMARY OF THE INVENTION

One aspect of the present invention relates to an energy curable composition including an at least difunctional thiol compound, an at least difunctional ethylenically unsaturated compound having a perfluorinated moiety, and a selected amount of a free radical initiator wherein at least one of the thiol compound and the ethylenically unsaturated compound is at least partially halogenated, the ratio of thiol moieties to ethylenically unsaturated moieties is between about 1:2 and about 2:1, and the thiol compound and the ethylenically unsaturated compound account for between about 35% and about 99.9% of the energy curable composition.

Another aspect of the present invention relates to a polymeric material having thioether moieties in a concentration of at least about 0.05 M; and at least one perhalogenated moiety.

Another aspect of the present invention relates to an optical element having a polymeric core, said core including a polymeric material including thioether moieties in a concentration of at least 0.05 M and at least one at least partially halogenated moiety.

Another aspect of the invention relates to a method of making an optical element including the steps of (a) applying a layer of a cladding composition to a substrate, the clad composition including an at least difunctional thiol compound, an at least difunctional ethylenically unsaturated compound, and an effective amount of a free radical initiator wherein at least one of the thiol compound and the ethylenically unsaturated compound is at least partially halogenated, the ratio of thiol moieties to isolated ethylenically unsaturated moieties is between about 1:2 and about 2:1 and the ethylenically unsaturated compound account for between about 35% and about 99.9% of the cladding composition; (b) at least partially curing the cladding composition to form a polymeric cladding layer; (c) applying a photosensitive core composition to the surface of the polymeric cladding layer to form a core composition layer, the core composition including an at least difunctional thiol compound, an at least difunctional ethylenically unsaturated compound, and an effective amount of a free radical initiator wherein at least one of the thiol compound and the ethylenically unsaturated compound is at least partially halogenated, the ratio of thiol moieties to isolated ethylenically unsaturated moieties is between about 1:2 and about 2:1 and the ethylenically unsaturated compound account for between about 35% and about 99.9% of the core composition; (d) imagewise exposing the photosensitive core composition layer to sufficient actinic radiation to effect the at least partial polymerization of an imaged portion and to form at least one non-imaged portion of the photosensitive core composition layer; (e) removing the at least one non-imaged portion without removing the imaged portion, thereby forming a polymeric patterned core from the imaged portion; (f) applying a photosensitive overclad composition onto the polymeric patterned core; and (g) at least partially curing the overclad composition to form a polymeric overclad layer, wherein the polymeric overclad layer and the polymeric cladding layer have a lower refractive index than the polymeric patterned core.

The compositions, methods, and devices of the present invention result in a number of advantages over prior art compositions, methods, and devices. For example, the compositions of the present invention are far less sensitive to oxygen during cure than analogous acrylate materials, and can be formulated to cure substantially completely in the presence of air, thus obviating the need for excluding oxygen during processing, such as in the photolithographic exposure step of the waveguide manufacturing process. The polymerized compositions of the present invention have a low optical loss throughout both the C-band and the L-band, allowing for the construction of optical waveguide devices suitable for use in either band. Since they cure in air, these compositions may also be used as adhesives, for example, in the pigtailing of optical fibers to waveguide devices. The compositions of the present invention may be formulated to have a low refractive index, making them especially useful in the pigtailing of optical fibers to highly fluorinated polymer optical waveguide devices.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION OF THE PREFERRED EMBODIMENTS

The invention provides an energy curable composition that may be cured in the presence of air to form a polymeric material which has a low optical loss in both the C-band and the L-band. As used herein, an energy curable composition is one, which may be cured by at least one of heat and actinic radiation. The energy curable composition includes an at least difunctional thiol compound, an at least difunctional ethylenically unsaturated compound, and a selected amount of a free radical photoinitiator. When initiated by a source of free radicals, thiols and ethylenic unsaturated moieties can undergo an addition reaction to form a thioether moiety. Without intending to be bound to any particular explanation for this curing system, the mechanism for the reaction is generally understood to be as follows: This section
Initiation:

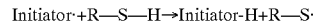

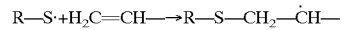

Propagation:

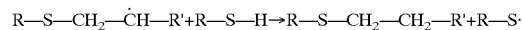

Termination

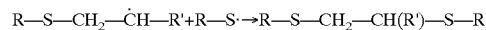

This reaction is known commonly as the thiol-ene reaction. In the initiation step of the reaction, an initiator-derived free radical removes a hydrogen atom from a thiol to create a thiyl radical. In the propagation steps, the thiyl radical reacts with a carbon-carbon double bond of an ethylenically unsaturated moiety, forming a thioether (R—S—CH$_2$—) and a carbon-centered radical intermediate. This carbon-centered radical intermediate removes a hydrogen atom from another molecule of thiol, and the propagation steps repeat. As will be appreciated by one of skill in the art, the reaction may be terminated in any one of a number of ways. In the reaction scheme given above, termination occurs through combination of a thiyl radical with a carbon-centered radical to give a bisthioether structure. However, termination may occur in any other art-recognized fashion.

Figure 1:
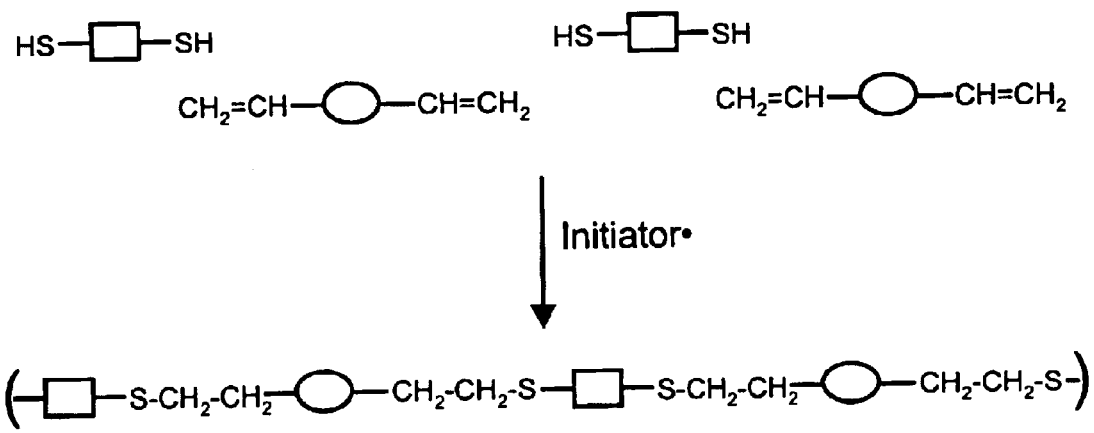
FIG. 1 is a schematic of a polymer system made from a difunctional thiol compound and a difunctional ethylenically unsaturated compound.
Figure 2:
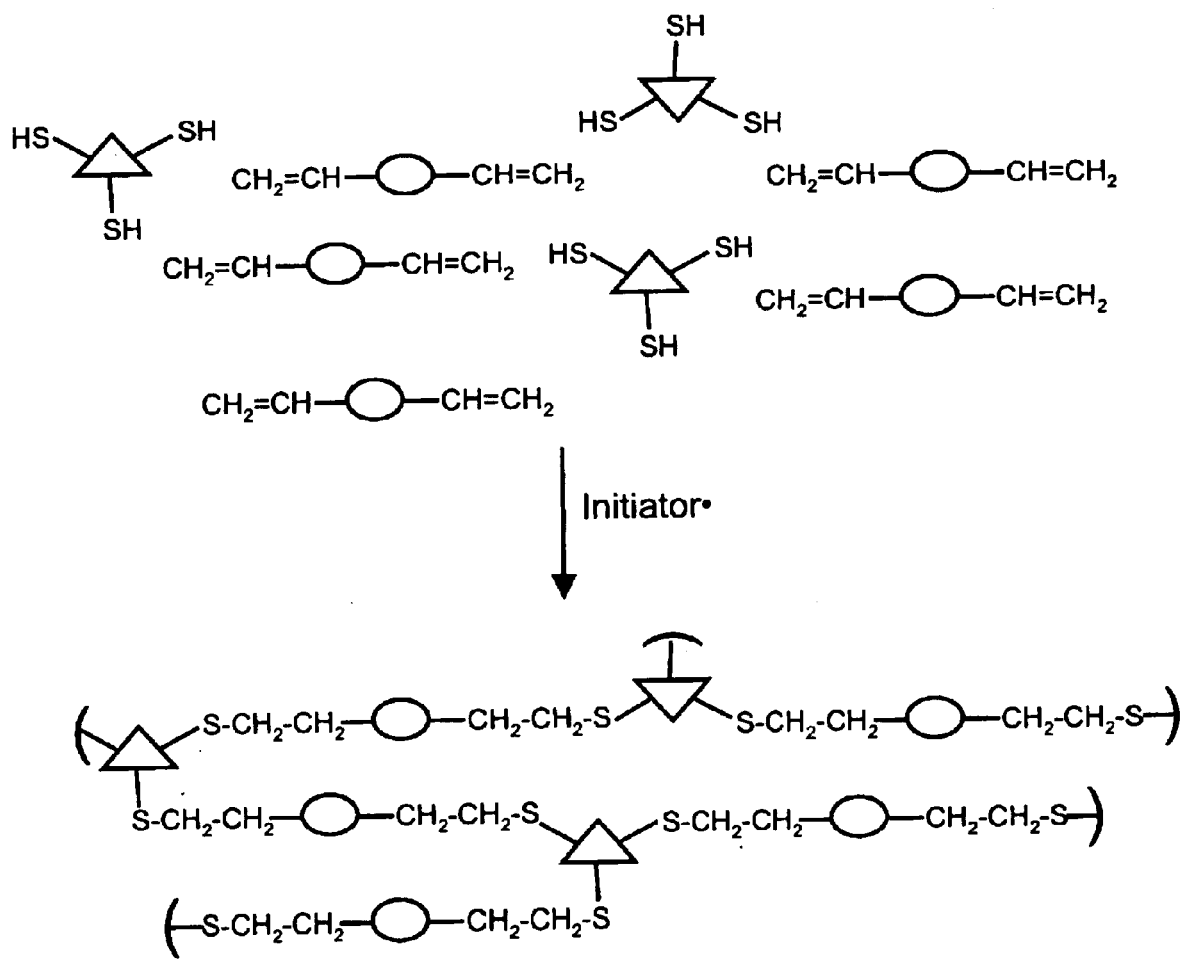
FIG. 2 is a schematic of a polymer system made from trifunctional thiol compound and a difunctional ethylenically unsaturated compound.

For this reaction to form a polymer, both the thiol compound and the ethylenically unsaturated compound must be at least difunctional. An at least difunctional ethylenically unsaturated compound has at least two ethylenic unsaturations that are not conjugated to one another and not part of an aromatic ring system. Ethylenic unsaturations are generally carbon-carbon double bonds, and include moieties such as, for example, acrylate, methacrylate, vinyl ether, allyl ether, alkene, thioacrylate ester, thiomethacrylate ester, vinyl thioether, allyl thioether, norbornene and maleimide. Likewise, an at least difunctional thiol compound has at least two thiol moieties. As shown in FIG. 1, the reaction of difunctional thiols with difunctional ethylenically unsaturated compounds yields a linear polymer. For this reaction to form a crosslinked polymer, it is necessary that at least one of the components be at least trifunctional. FIG. 2 shows a crosslinked polymer made from a difunctional ethylenically unsaturated compound and a trifunctional thiol.

Thiols for use in this invention must be at least difunctional, having at least two reactive thiol (—SH) moieties. Thiols may be aliphatic or aromatic, and may include other functional groups such as, for example, ester, amide, ether, thioether, thioester, and urethane. Examples of at least difunctional thiols include, for example, 1,3-propanedithiol; 1,6-hexanedithiol; 2-mercaptoethyl ether; benzene-dimethanethiols; trimethylolpropane tri(3-mercaptopropionate); and ethylene glycol di(3-mercaptopropionate).

In addition to thiols as described above, especially suitable thiols for use in this invention are at least partially halogenated. The thiols may include carbon-fluorine, carbon-chlorine, and/or carbon-bromine bonds. The degree and type of halogenation may be used to control the refractive index and optical loss contributed by the thiol to the polymeric material.

Desirable thiols for use in this invention include a perhalogenated or substantially perhalogenated moiety. A perhalogenated moiety is a halocarbon moiety in which C—H bonds have been replaced by C—X bonds (X=F, Cl or Br) and may include other elements such as oxygen, nitrogen and sulfur. The perhalogenated moiety may be chosen from a number of structural classes, such as, for example, perhaloaryl, perhaloarylene, branched perhaloalkanes and -alkylenes, and straight chain perhaloalkanes and -alkylenes.

Especially desirable thiols for use in this invention include a perfluorinated moiety. A perfluorinated moiety is a fluorocarbon moiety in which C—H bonds have been replaced by C—F bonds, and may include other elements such as oxygen, nitrogen, and sulfur. The perfluorinated moiety may be chosen from a number of structural classes, such as perfluoroaryl, perfluoroarylene, branched perfluoroalkanes and -alkylenes, and straight chain perfluoroalkanes and -alkylenes.

As used herein, a substantially perhalogenated moiety is defined as a moiety in which >75% of the C—H bonds are replaced by C—X bonds. Likewise, a substantially perfluorinated moiety is defined as a moiety in which >75% of the C—H bonds are replaced by C—F bonds.

Especially suitable perfluorinated moieties for use in the invention include, for example:

—(CF$_2$)$_x$—;
—(C$_6$F$_4$)$_x$—;
—(CF$_3$)$_2$C—;
—CF$_2$O—[(CF$_2$CF$_2$O)$_m$(CF$_2$O)$_n$]—CF$_2$—;
—CF(CF$_3$)O(CF$_2$)$_4$O[CF(CF$_3$)CF$_2$O]$_p$CF(CF$_3$)—; and
—CF$_2$O—(CF$_2$CF$_2$O)$_m$—CF$_2$—, wherein x is an integer between 1 and about 10; m and n designate the number of randomly distributed perfluoroethyleneoxy and perfluoromethyleneoxy backbone repeating subunits, respectively; and p designates the number of —CF(CF$_3$)CF$_2$O— backbone repeating subunits. The use of other perfluorinated moieties, such as, for example, tetrafluorophthaloyl, is also contemplated within the scope of this invention.

Desirable thiol compounds for use in the invention have the structure

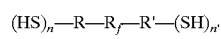
(HS)$_n$—R—R$_f$—R'—(SH)$_{n'}$ wherein R$_f$ is a perfluorinated moiety selected from the group consisting of:

—(CF$_2$)$_x$—;
—(C$_6$F$_4$)$_x$—;
—(CF$_3$)$_2$C—;
—CF$_2$O—[(CF$_2$CF$_2$O)$_m$(CF$_2$O)$_n$]—CF$_2$—;
—CF(CF$_3$)O(CF$_2$)$_4$O[CF(CF$_3$)CF$_2$O]$_p$CF(CF$_3$)—; and
—CF$_2$O—(CF$_2$CF$_2$O)$_m$—CF$_2$—, wherein x is an integer between 1 and about 10; m and n designate the number of randomly distributed perfluoroethyleneoxy and perfluoromethyleneoxy backbone repeating subunits, respectively; and p designates the number of —CF(CF$_3$)CF$_2$O— backbone repeating subunits;

R and R' are divalent or trivalent connecting moieties selected individually from the group consisting of alkyl, aryl, ester, ether, amide, amine, urethane, thioester and thioether groups; wherein n is 1 if R is divalent, and 2 if R is trivalent; and n' is 1 if R' is divalent and 2 if R' is trivalent. Especially suitable connecting moieties include —CH$_2$— and

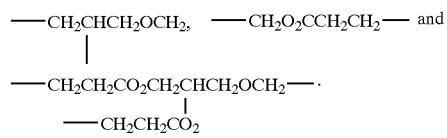
—CH$_2$CHCH$_2$OCH$_2$,   —CH$_2$O$_2$CCH$_2$CH$_2$— and
—CH$_2$CH$_2$CO$_2$CH$_2$CHCH$_2$OCH$_2$—·
—CH$_2$CH$_2$CO$_2$ In light of this disclosure, the skilled artisan will recognize that a wide variety of connecting moieties could be used in addition to those specifically listed herein.

Suitable thiol compounds including a perfluorinated moiety for use in this invention include

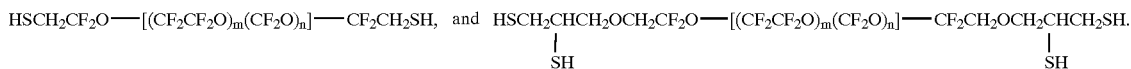
HSCH$_2$CF$_2$O—[(CF$_2$CF$_2$O)$_m$(CF$_2$O)$_n$]—CF$_2$CH$_2$SH, and HSCH$_2$CHCH$_2$OCH$_2$CF$_2$O—[(CF$_2$CF$_2$O)$_m$(CF$_2$O)$_n$]—CF$_2$CH$_2$OCH$_2$CHCH$_2$SH.
　　　　　　　　　　　　　　　　　　　　　　　　　　　　　　　|　　　　　　　　　　　　　　　　　　　　　　　　　　　　　　　　　　　　　　　　　　　　　　　　　|
　　　　　　　　　　　　　　　　　　　　　　　　　　　　　　　SH　　　　　　　　　　　　　　　　　　　　　　　　　　　　　　　　　　　　　　　　　　　　　　　SH These compounds may be synthesized, for example, by conversion of the corresponding diol or tetraol to the corresponding bis- or tetrakis(nonafluoro-1-butanesulfonate), followed by reaction with thiourea and saponification, as described in the Example, below.

Other examples of desirable thiol compounds for use in this invention include

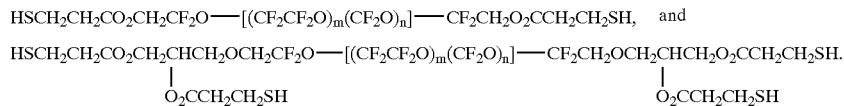

These compounds may be synthesized, for example, by esterification of the corresponding diol or tetraol with mercaptopropionic acid, as would be recognized by a person of skill in the art and as described in the Example below.

The use of at least difunctional thiols other than those specifically described herein is contemplated within the scope of the present invention. Halogenated or non-halogenated at least difunctional thiols may be made by any method generally known in the art, including, for example, esterification of an at least difunctional alcohol with 3-mercaptopropionic acid, or reaction of an at least difunctional bromide, p-toluenesulfonate, or nonafluoro-1-butanesulfonate with thiourea followed by saponification.

Ethylenically unsaturated compounds for use in this invention include at least two ethylenically unsaturated moieties. The ethylenically unsaturated moieties are chosen to be reactive in the thiol-ene reaction, and may be, for example, acrylate, methacrylate, vinyl ether, allyl ether, alkene, thioacrylate ester, thiomethacrylate ester, vinyl thioether, allyl thioether, and maleimide. The ethylenically unsaturated moieties may be able to undergo free radical homopolymerization (e.g. methacrylate), or may not homopolymerize by a free radical mechanism (e.g. vinyl ether).

The ethylenically unsaturated moieties themselves may be halogenated. For example, the use of species such as 2-(trifluoromethyl)acrylate, trifluoroacrylate, trifluorovinyl, and trifluoroalkene may be desirable due to their low concentration of C—H bonds and correspondingly low optical loss. For use herein, the ethylenically unsaturated moiety may also be an alkyne.

Desirable ethylenically unsaturated compounds for use in this invention are at least partially halogenated, and may include carbon-fluorine, carbon-chlorine, and carbon-bromine bonds. The degree and type of halogenation may be used to control the refractive index and optical loss contributed by the ethylenically unsaturated compound to the polymeric material.

Especially desirable ethylenically unsaturated compounds for use in this invention include a perfluorinated moiety. A perfluorinated moiety is a fluorocarbon moiety that has substantially no carbon-hydrogen bonds, and may include other elements such as oxygen, nitrogen, sulfur, chlorine and bromine. The perfluorinated moiety may be chosen from a number of structural classes, such as perfluoroaryl, perfluoroarylene, branched perfluoroalkanes and -alkylenes, and straight chain perfluoroalkanes and -alkylenes. Especially desirable ethylenically unsaturated compounds for use in the invention have the structure $(A)_n—R—R_f—R'—(A)_{n'}$.

wherein $R_f$ is a perfluorinated moiety selected from the group consisting of:

—(CF$_2$)$_x$—,
—CF$_2$—[(CF$_2$CF$_2$O)$_m$(CF$_2$O)$_n$]—CF$_2$—,
—CF(CF$_3$)O(CF$_2$)$_4$O[CF(CF$_3$)CF$_2$O]$_p$CF(CF$_3$)—, and
—CF$_2$O—(CF$_2$CF$_2$O)$_m$—CF$_2$—, wherein x is an integer between 1 and about 10; m and n designate the number of randomly distributed perfluoroethyleneoxy and perfluoromethyleneoxy backbone repeating subunits, respectively; and p designates the number of —CF(CF$_3$)CF$_2$— backbone repeating subunits;

R and R' are divalent or trivalent connecting moieties selected individually from the group consisting of alkyl, aryl, ester, ether, amide, amine, urethane, thioester and thioether groups; A is an ethylenically unsaturated group selected from the group consisting of CX$_2$=C(X)COE—,
CX$_2$=C(CX$_3$)COE—,
CX$_2$=CX—,
CX$_2$=CX—E—, and
CX$_2$=CX—CH$_2$—E—, wherein E=O or S; each X is individually H, D, F, or Cl; n is 1 if R is divalent, and 2 if R is trivalent; and ' is 1 if R' is divalent and 2 if R' is trivalent. Especially suitable connecting moieties include, for example, —CH$_2$— and

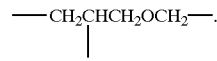

These and other suitable materials are described in commonly owned and copending U.S. patent application Ser. No. 09/745,076, which is incorporated herein by reference. In light of this disclosure, the skilled artisan will recognize that a wide variety of connecting moieties could be used in addition to those specifically listed herein.

Ethylenically unsaturated compounds including a perfluorinated moiety such as —(CF$_2$)$_n$— and a connecting moiety such as —CH$_2$— may be made by, for example, acrylation, methacrylation, vinylation, or allylation of the fluorinated diols of the structure HO—CH$_2$—(CF$_2$)$_n$—CH$_2$—OH, where n is from 1 to about 10. An example of such a material is 2,2,3,3,4,4,5,5-octafluorohexane-1,6-diyl diacrylate. These materials tend to produce relatively hard films of high crosslink density. They have excellent adhesive properties but have higher absorption losses than some of the other ethylenically unsaturated compounds described for use herein.

When the perfluorinated moiety $R_f$ is —CF$_2$O—[(CF$_2$CF$_2$O)$_m$(CF$_2$O)$_n$]—CF$_2$—, the ratio of m:n generally varies from about 0.5:1 to about 1.4:1. A sample of these materials will include a distribution of molecules having different numbers of repeating subunits. In such a sample, the average value of m generally falls within the range of from about 6.34 to about 18.34, and the average value of n generally falls within the range of from about 5.94 to about 13.93. Especially suitable materials have a ratio of m:n of about 1, average values of m and n of about 10.3, and molecular weights between about 2000 and about 2800. These materials may be made, for example, by acrylating, methacrylating, vinylating, or allylating a perfluoropolyether diol with the structure HO—CH$_2$CF$_2$O—[(CF$_2$CF$_2$O)$_m$(CF$_2$O)$_n$]—CF$_2$CH$_2$—OH, sold under the trade name Fluorolink® D10 by Ausimont USA, or alternatively from a perfluoropolyether tetraol with the structure HO—CH$_2$CH(OH)CH$_2$OCH$_2$CF$_2$O—[(CF$_2$CF$_2$O)$_m$(CF$_2$O)$_n$]—CF$_2$CH$_2$OCH$_2$CH(OH)CH$_2$—OH, sold under the trade name Fluorolink® T by Ausimont USA. Typical art-recognized acrylation, methacrylation, vinylation, and allylation methods may be used. Examples of acrylation and allylation of perfluoropolyethers are described herein below.

As stated above, the at least partially halogenated ethylenically unsaturated compound may include chlorine or bromine. Thus, an example of a suitable ethylenically unsaturated compound is

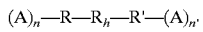

wherein $R_h$ is a halogenated moiety selected from the group consisting of:
—(CF$_2$CFX$_1$)$_a$—CF$_2$—,
—(CF$_2$CFX$_1$)$_a$—(CFX$_2$CF$_2$)$_b$—,
—(CF$_2$CFX$_1$)$_a$—(CFX$_2$CF$_2$)$_b$—CF$_2$, and
—(CF$_2$CFX$_1$)$_a$—(CH$_2$CY$_1$Y$_2$)$_b$—(CF$_2$CFX$_1$)$_c$—CF$_2$,
wherein X$_1$=Cl or Br; X$_2$=F, Cl, or Br; Y$_1$ and Y$_2$ are independently H, CH$_3$, F, Cl, or Br; and a, b, and c are independently integers from 1 to about 10; R and R' are divalent or trivalent connecting moieties selected individually from the group consisting of alkyl, aryl, ester, ether, amide, amine, urethane, thioester and thioether groups; A is an ethylenically unsaturated group selected from the group consisting of CX$_2$=C(X)COE—,
CX$_2$=C(CX$_3$)COE—,
CX$_2$=CX—, and
CX$_2$=CX—E—, and
CX$_2$=CX—CH$_2$—E—, wherein E=O or S; each X is individually H, D, F, or Cl; n is 1 if R is divalent, and 2 if R is trivalent; and n' is 1 if R' is divalent and 2 if R' is trivalent. Especially suitable connecting moieties include, for example, —CH$_2$— and

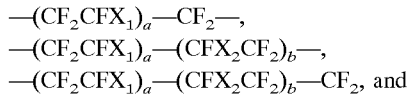

These and other suitable materials are described in commonly owned and copending U.S. patent application Ser. No. 08/842,783, which is incorporated herein by reference. In light of this disclosure, the skilled artisan will recognize that a wide variety of connecting moieties could be used in addition to those specifically listed herein. One purpose in incorporating chlorine or bromine atoms in the structure is to raise the refractive index and surface energy above that of a fully fluorinated system without increasing optical loss due to C—H bond absorption.

At least partially halogenated thiomethacrylates, thioacrylates, and vinyl and allyl thioethers may be made from the corresponding thiols, including those described above, by methods known and understood by the skilled artisan. For example, thioacrylates may be synthesized by treating the corresponding thiol with acryloyl chloride in the presence of base; and allyl thioethers may be made by treating the corresponding thiol with allyl bromide.

Other at least partially halogenated ethylenically unsaturated compounds suitable for use in this invention include 2,2-bis(4-hydroxyphenyl)tetrafluoropropane diacrylate; CH$_2$=CHCO$_2$—CH$_2$CF(CF$_3$)O(CF$_2$)$_4$O[CF(CF$_3$)CF$_2$O]$_p$CF(CF$_3$)CH$_2$O$_2$CCH=CH$_2$ having the trade name L-12043 available from 3M Specialty Chemicals Division; CH$_2$=CHCO$_2$—CH$_2$CF$_2$O—[(CF$_2$CF$_2$O)$_m$(CF$_2$O)$_n$]—CF$_2$CH$_2$—O$_2$CCH=CH$_2$, sold under the trade name L-9367 by 3M Specialty Chemicals Division; and F(CF$_2$)$_7$—CH$_2$CH$_2$—C(CO$_2$CH$_2$CH$_2$CH$_2$CH$_2$O—CH=CH$_2$)$_2$, sold under the trade name FAVE 4101 by Honeywell, and the chlorofluorinated polyester acrylate

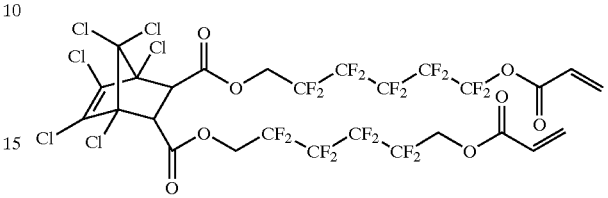

described in commonly owned and copending U.S. patent application Ser. No. 09/747,068, which is incorporated herein by reference.

Additionally, non-halogenated at least difunctional ethylenically unsaturated compounds may be used in the present invention. The skilled artisan will appreciate that there exists in the art a vast selection of such compounds, including, for example, ethoxylated bisphenol A diacrylate, trimethylolpropane triacrylate, diallyl phthalate, and poly(ethylene glycol) divinyl ether.

The energy curable composition may include a selected amount of a free radical initiator. The free radical initiator can be a photoinitiator, generating free radical species upon exposure to actinic radiation. Any photoinitiator known to initiate the thiol-ene reaction can be used. The photoinitiator is desirably thermally inactive at common ambient temperatures, and is preferably inactive below about 60° C. Suitable free-radical type photoinitiators nonexclusively include quinoxaline compounds; the vicinal polyketaldonyl compounds; the alpha-carbonyls; the acyloin ethers; the triarylimidazolyl dimers; the alpha-hydrocarbon substituted aromatic acyloins; polynuclear quinones and s-triazines.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Typical photoinitiators are 1-hydroxycyclohexyl phenyl ketone (Irgacure® 184), benzoin, benzoin ethyl ether, benzoin isopropyl ether, benzophenone, benzodimethyl ketal (Irgacure 651), 2,2-diethoxyacetophenone, 2-hydroxy-2-methyl-1-phenylpropan-1-one (Darocur® 1173), 1-[4-(2-hydroxyethoxy)phenyl]-2-hydroxy-2-methyl-propan-1-one (Darocur 2959), 2-methyl-1-[4-(methylthio)phenyl]-2-morpholinopropan-1-one (Irgacure 907), 2-benzyl-2-dimethylamino-1-(4-morpholinophenyl)butan-1-one (Irgacure 369), poly{1-[4-(1-methylvinyl)phenyl]-2-hydroxy-2-methylpropan-1-one} (Esacure® KIP), and [4-(4-methylphenylthio)-phenyl]phenylmethanone (Quantacure® BMS from Great Lakes Fine Chemicals Limited of London, England). The most desired photoinitiators are those which tend not to yellow upon irradiation. Such photoinitiators include benzodimethyl ketal (Irgacure® 651), 2-hydroxy-2-methyl-1-phenylpropan-1-one (Darocur 1173 available from E. Merck of Darmstadt, Germany), 1-hydroxycyclohexyl phenyl ketone (Irgacure 184), and 1-[4-(2-hydroxyethoxy)phenyl]-2-hydroxy-2-methylpropan-1-one (Darocur 2959). For the more highly fluorinated energy curable compositions, such as those including L-12043 and L-9367 from 3M, a fluorinated photoinitiator such as 2-(1H,1H,2H,2H-heptadecafluoro-1-decoxy)-2-methyl-1-phenylpropan-1-one, described in U.S. Pat. No. 5,391,587, which is incorporated herein by reference, may be required.

Initiators for use in this invention may also include selected amounts of thermal initiators, generating free radical species upon exposure to heat. Suitable known thermal initiators include, but are not limited to, substituted or unsubstituted organic peroxides, azo compounds, pinacols, thiurams, and mixtures thereof. Examples of operable organic peroxides include, but are not limited to, benzoyl peroxide, p-chlorobenzoyl peroxide, methyl ethyl ketone peroxide, tert-butyl perbenzoate, cumene hydroperoxide, di-sec-butyl peroxide, and 1,1,-di(tert-butylperoxy)-3,3,5-trimethylcyclohexane. Suitable azo compound initiators include, but are not limited to, 2,2'-azobisisobutyronitrile, (1-phenylethyl)azodiphenylmethane, dimethyl-2,2'-azobis(1-cyclohexanecarbonitrile), and 2,2'-azobis(2-methylpropane).

The free radical generating initiator, photo or thermal, may be present in the energy curable composition in a selected amount sufficient to effect polymerization of the composition upon exposure to sufficient energy of an appropriate type. For example, a photoinitiator is present in an amount sufficient to effect polymerization upon exposure to sufficient actinic radiation. The initiator is generally present in an amount of from about 0.01% to about 10% by weight of the overall composition, or more usually from about 0.1% to about 6% and suitably from about 0.5% to about 4% by weight based on the total weight of the composition. Mixtures of initiators may also be used. In certain special cases, such as when curing via exposure to electron beam radiation, the energy curable composition may not require a free-radical initiator, since said free-radicals may be generated in situ via the action of the electron beam radiation.

Additional examples of photo- and thermal initiators may be found in publications known to those skilled in the art; for example, W. R. Sorenson and T. W. Campbell, *Preparative Methods in Polymer Chemistry*, 2$^{nd}$ Ed. (Interscience Publishers, New York 1968).

Other additives may also be added to the energy curable compositions depending on the purpose and the end use of the compositions. Examples of these include solvents, antioxidants, photostabilizers, volume expanders, fillers such as for example silica, titania, glass spheres and the like (especially when in the nanoscale regime, particle size less than about 100 nm), dyes, free radical scavengers, contrast enhancers, nitrones and UV absorbers. Antioxidants include such compounds as phenols and particularly hindered phenols including Irganox® 1010 from Ciba Additives of Tarrytown, N.Y.; sulfides; organoboron compounds; organophosphorous compounds; N,N'-hexamethylenebis(3,5-di-tert-butyl-4-hydroxyhydrocinnamide) available from Ciba Additives under the tradename Irganox 1098. Photo stabilizers and more particularly hindered amine light stabilizers include but are not limited to poly[(6-morpholino-s-triazine-2,4-diyl)[(2,2,6,6,-tetramethyl-4-piperidyl)imino]-hexamethylene [(2,2,6,6,-tetramethyl-4-piperidyl)imino]] available from Cytec Industries of Wilmington, Del. under the trade name Cyasorb® UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. Each of these additives may be included in quantities up to about 6%, based upon the total weight of the composition, and usually from about 0.1% to about 1%.

As the person of skill in the art will recognize, more than one ethylenically unsaturated compound, thiol compound, and photoinitiator may be employed in a single composition. Blending of different compounds allows for the tuning of the properties of the energy curable composition and the polymeric material by the skilled artisan. It may be desirable to formulate an energy curable composition with a mixture of halogenated and non-halogenated thiols and ethylenically unsaturated compounds. For example, suitable energy curable compositions may include non-halogenated thiols in admixture with halogenated ethylenically unsaturated compounds. Alternatively, suitable energy curable compositions may include halogenated thiols in admixture with non-halogenated ethylenically unsaturated compounds. In the energy curable compositions of the present inventions, at least one of the thiol compound or the ethylenically unsaturated compound is at least partially halogenated. In addition, it is also possible to include the use of dissolved thermoplastic polymer materials in these formulations. The use of alternative monomers and polymers is limited strictly by their compatibility with the cured polymers of this invention. Usually all components of the overall composition are in admixture with one another, and most desirably in a substantially uniform admixture.

Mixtures of ethylenically unsaturated compounds and/or thiol compounds may be used to tune the refractive index of the energy curable composition and the cured polymer derived therefrom. For example, the refractive index of a composition may be controlled by varying the compositional ratio of a low refractive index perfluoropolyether acrylate and the higher refractive index 2,2,3,3,4,4,5,5-octafluorohexane-1,6-diyl diacrylate. The refractive index of a composition may also be controlled by varying the compositional ratio of a low refractive index perfluoropolyether thiol and the higher refractive index 1,6-hexanedithiol. This is especially necessary in formulating compositions for planar waveguides, in which the various layers must have well-defined refractive indices.

As will be appreciated by the skilled artisan, mixtures of ethylenically unsaturated compounds and/or thiol compounds may also be used to tune other properties of the energy curable composition and of the polymeric material, such as, for example, viscosity, wettability, crosslink density, hardness, surface energy, and other such properties. The compositional ratio of thiol moieties to ethylenically unsaturated moieties chosen depends on the desired properties of the cured polymer. Since the stoichiometry of the thiol-ene reaction is 1:1 as described above, equal numbers of thiol moieties and ethylenic unsaturated moieties may be used. Suitable energy curable compositions have a ratio of thiol moieties:ethylenic unsaturated moieties between about 9:10 and about 10:9, and especially suitable energy curable compositions have a ratio of thiol moieties:ethylenic unsaturated moieties between about 19:20 and about 20:19. In embodiments wherein the ethylenically unsaturated moieties cannot homopolymerize, a ratio of thiol moieties:ethylenically unsaturated moieties of about 1:1 ensures highly efficient cure of all polymerizable groups of the composition.

However, in many situations, it may be desired to use a different ratio of thiol moieties to ethylenic unsaturated moieties. For example, if it is desired to completely convert the ethylenic unsaturated moieties to thioethers in the polymerization process, an excess of thiol, up to a mole ratio of thiol moieties:ethylenic unsaturated moieties of up to 2:1 may be used. As the S—H bond does not absorb strongly at communications wavelengths, unreacted thiols will not have a substantially deleterious effect on the optical loss of the polymeric material. If it is desired to convert all thiols to thioethers during polymerization, a mole ratio of thiol moieties:ethylenic unsaturated moieties of down to 1:2 may be used. In embodiments wherein the ethylenically unsaturated moieties can homopolymerize, a 1:1 ratio of thiol moieties:ethylenically unsaturated moieties is not required for complete reaction of substantially all of the thiol and the ethylenically unsaturated moieties. Efficient reaction may occur with ratios of down to 1:2 when the ethylenically unsaturated compound is capable of homopolymerization. Such non-stochiometric ratios of thiol moieties:ethylenically unsaturated compound can be effective in lowering the concentration of unreacted carbon-carbon double bonds in the polymeric material, and therefore in lowering the optical loss of the polymeric material in the L-band. In evaluating the relative merits of a particular ethylenically unsaturated compound or thiol compound based on its structure, it is useful to determine the molar concentration of light-absorbing bonds to hydrogen for a particular candidate material. Since C—H, N—H, and O—H bond stretching vibrational overtones are a major source of absorption loss in the communications wavelengths, reduction of the concentration of these bonds will reduce the material absorption loss. The analogous overtone of sulfur-hydrogen bonds is very weak and appears above 1900 nm, and thus is not a significant source of absorption loss. The molar concentration of hydrogen ($C_H$) for a particular compound can be calculated from the number of C—H, N—H, and O—H bonds per molecule (H); the molecular weight of the compound (Mw), and the density of the material ($\rho$), as shown in the equation:

$$C_H = \frac{H \cdot \rho}{Mw}$$

The person of skill in the art will realize that the $C_H$ for a formulated energy curable composition may be calculated as a weighted average of the $C_H$ values of each individual constituent. While an exact relationship between $C_H$ and the absorption loss of a particular material or fabricated device is unlikely, this relation gives an initial indication of which materials may be useful in lowering optical loss values. When carrying out these calculations for a polymeric material, it is most appropriate to use the density of a cured film of the compound, as it is the loss of the cured film that is of greatest interest. However, since the measure of density of such films is difficult, the density of the liquid can be used with the understanding that the approximation does introduce a small amount of error. Suitable energy curable compositions and polymeric materials for use herein have a $C_H$ of below about 55 M. Desirable energy curable compositions and polymeric materials have a $C_H$ of below about 35 M. Especially desirable energy curable compositions and polymeric materials have a $C_H$ of below about 20 M. For waveguide applications, most desirable compositions and polymeric materials have a $C_H$ of below about 15 M. As will be appreciated by the skilled artisan, $C_H$ may be controlled by judicious formulation of halogenated and non-halogenated thiol compounds and halogenated and non-halogenated ethylenically unsaturated compounds of different chain lengths. $C_H$ values for some exemplary materials are given in the Examples, below.

The energy curable compositions of the invention may be at least partially polymerized by exposure to a suitable type and amount of energy. For example, compositions formulated with a thermal initiator may be polymerized by the application of heat. Temperatures depend on the thermal initiator and usually range from about 60° C. to about 200° C.; however, temperatures between 70° C. and 100° C. are preferred. Thermal polymerization times may vary from several seconds to several hours, depending on the temperature and initiator used.

Compositions formulated with a photoinitiator may be polymerized by exposure to actinic radiation, defined as light in the visible, ultraviolet, or infrared regions of the electromagnetic spectrum, as well as electron beam, ion or beam, or X-ray radiation. Actinic radiation may be in the form of incoherent light or coherent light, for example, from a laser. Sources of actinic light and exposure procedures, times, wavelengths and intensities may vary widely depending on the desired degree of polymerization, the index of refraction of the material, and other factors known to those of ordinary skill in the art. Such conventional photopolymerization processes and their operational parameters are well known in the art. Sources of actinic radiation and the wavelength of the radiation may vary widely, and any conventional wavelength and source can be used. It is preferable that the photoinitiator require that photochemical excitation be carried out with relatively short wavelength (high energy) radiation, so that exposure to radiation normally encountered before processing (e.g. room lights) will not prematurely polymerize the energy curable composition. Thus, exposure to ultraviolet light or deep ultraviolet light are useful.

Convenient sources include high pressure xenon or mercury-xenon arc lamps filled with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-double argon ion laser with an output near 257 nm wavelength is highly desirable. Electron beam or ion beam excitation may also be used. Alternatively, the processing can utilize a multiphoton process initiated by a high intensity source of actinic radiation, such as a laser. Typical exposure times vary from a few tenths of seconds to about several minutes depending on the actinic source. When partial curing is desired, curing levels between about 50% and 90% are generally preferred. Photopolymerization temperatures usually range from about 10° C. to about 60° C.; however, room temperature is preferred.

In the polymerization process, thiol moieties are converted to thioether moieties, putatively by the mechanism detailed above. As will be appreciated by the skilled artisan, the polymerization parameters may be chosen to yield a partially polymerized material. Partially polymerized means that not all thiol-ethylenic unsaturated moiety pairs are converted to thioethers; thus some ethylenically unsaturated moieties and some thiol moieties are present after polymerization. This means that more than 0% but less than 50%, and preferably less than 20% of the number of thiol moieties or more than 0% but less than 50%, and preferably less than 20% of the number of ethylenically unsaturated moieties remain unreacted in the polymerization process. Partial polymerization is especially useful in constructing layered structures; partial polymerization of a first layer of an energy curable composition prior to application of a second layer of an energy curable composition allows the two layers to intermingle at their interface. Reactive moieties in one layer will react with those in a contiguous layer, improving interlayer adhesion. Further, a gradient index between layers may be formed by the diffusion of monomers between layers.

The concentration of thioether moieties in a sample of at least partially polymerized material will depend on both the concentration of thiol moieties in the original energy curable composition and the degree of polymerization. In the case of a polymer made by polymerizing a composition having a single thiol compound and a single ethylenically unsaturated compound and having excess thiol moieties, the concentration of thioether moieties may be estimated using the formula:

$$\text{Thioether concentration} = \frac{\rho \cdot \left(\frac{y \cdot Mw_e}{f_e} + \frac{y \cdot Mw_t}{f_t}\right) \cdot DOC_e \cdot N_{fru}}{Mw_{fru} \cdot \left(\frac{y \cdot Mw_e}{f_e} + \frac{x \cdot Mw_t}{f_t}\right)}$$

wherein x:y is the ratio of thiol moieties to ethylenically unsaturated moieties in the composition, $Mw_t$ is the molecular weight of the thiol compound, $Mw_e$ is the molecular weight of the ethylenically unsaturated compound, $f_t$ is the functionality of the thiol compound, $f_e$ is the functionality of the ethylenically unsaturated compound, $Mw_{fru}$ is the molecular weight of the fundamental repeat unit, $N_{fru}$ is the number of thioether linkages in the fundamental repeat unit, $DOC_e$ is the fraction of ethylenically unsaturated moieties converted to thioethers in the polymerization process, and $\rho$ is the density of the polymeric material.

In the case of a polymer made by polymerizing a composition having a single thiol compound and a single ethylenically unsaturated compound and having excess ethylenically unsaturated moieties, the concentration of thioether moieties may be calculated using the formula:

$$\text{Thioether concentration} = \frac{\rho \cdot \left(\frac{x \cdot Mw_e}{f_e} + \frac{x \cdot Mw_t}{f_t}\right) \cdot DOC_t \cdot N_{fru}}{Mw_{fru} \cdot \left(\frac{y \cdot Mw_e}{f_e} + \frac{x \cdot Mw_t}{f_t}\right)}$$

wherein $DOC_t$ is the fraction of thiol moieties converted to thioethers in the polymerization process. As noted above, the density of the initial energy curable composition may be used as an approximation for the density of the cured material. Further, the person of skill in the art will recognize that these equations assume that the energy curable compositions consist completely of thiol compound and ethylenically unsaturated compound. The equations may be adjusted to reflect inventive compositions that differ significantly from this assumption. Also, polymers in accordance with this invention may be made from compositions having more than one thiol compound and/or more than one ethylenically unsaturated compound; the skilled artisan will modify the given equations to reflect this fact. Thioether concentrations of exemplary materials appear in the Examples, below.

The compositions of the present invention undergo less shrinkage upon curing than do analogous materials cured by reaction of carbon-carbon double bonds (e.g. polyacrylates.) For example, when 2,2,3,3,4,4,5,5,6,6-octafluorohexane-1, 6-diyl diacrylate was cured as a thick slab, the sample cracked due to stress and showed a significant amount of shrinkage upon curing. A composition of the difunctional ethylenically unsaturated compound 2,2,3,3,4,4,5,5,6,6-octafluorohexane-1,6-diyl diacrylate and the trifunctional thiol trimethylolpropane tri(3-mercaptopropionate) was cured to give an uncracked slab with significantly less shrinkage. Further, the material was softer and more flexible than the polyacrylate. The lower stress and shrinkage in the thiol-ene derived materials is due to the separation of crosslinking sites in the polymer structure. In the polyacrylate materials, crosslinking branch points are only separated by one atom; in the materials of the present invention, they are separated by the combined length of the thiol compound main chain and the ethylenically unsaturated compound main chain. In the example given above, the crosslinking sites are separated by twenty five atoms, reducing the stress on the system. Low shrinkage materials should have minimal birefringence, making them beneficial for minimizing polarization effects in optical devices.

The compositions and polymers of the present invention are especially useful in the fabrication of planar optical waveguides. A method for the fabrication of polymeric waveguides is disclosed in commonly held and copending U.S. patent application Ser. No. 09/846,697, which is incorporated herein by reference. The materials of the present invention are especially advantageous, as they may be formulated to not require processing under oxygen-free conditions. For example, energy curable compositions with a ratio of thiols:ethylenically unsaturated moieties of 1:1 or greater are much less sensitive to oxygen during curing than are the analogous acrylate or methacrylate compositions. An example of a waveguide structure appears in FIG. 3. In an embodiment of the present invention, a suitable substrate 2 is rigorously chemically cleaned, for example with concentrated aqueous sodium hydroxide. The substrate 2 may then be primed with acrylate-, thiol-, amino-, or isocyanato-functionalized chloro- or alkoxysilane compounds. For example, it may be treated with (3-acryloxypropyl) trichlorosilane. This is optionally followed by application via spin coating of a photosensitive adhesion promoting tie layer composition. In this and subsequent spin coating steps, the edge bead formed in the spinning process may be removed by methods known by the skilled artisan (e.g. rinsing the circumference of the wafer with a suitable solvent during the final seconds of the spin). The tie layer is preferably highly crosslinkable and contains either ethylenically unsaturated moieties, thiol moieties, or both. If used, the tie layer composition is exposed to sufficient actinic radiation to cure the tie layer to at least a level above its gel point. Alternatively, suitable tie layers may comprise other polymers such as epoxies, polyacrylates, or poly(vinyl ethers). Thereafter, a layer 4 of photosensitive buffer composition is applied by spin coating. The buffer composition is formulated in accordance with this invention, and is formulated, as described above, to have a refractive index when cured of about 1% to about 3% lower than that of a core material. The buffer composition is exposed to sufficient actinic radiation to partially cure it to a level below full cure and above its gel point. Then, a photosensitive clad composition 6 is applied to the surface 5 of the polymeric buffer layer by spin coating. The clad composition is formulated in accordance with this invention, and is formulated, as described above, to have a refractive index when cured of about 0.3% to about 1.5% lower than that of the core material. The laminate so constructed is exposed to sufficient actinic radiation to partially cure the clad composition to a level below full cure and above its gel point. Then, a layer of photosensitive core composition, formulated in accordance with this invention, is applied to the surface 7 of the polymeric clad layer by spin coating. The core composition is then imagewise exposed to sufficient actinic radiation to effect the at least partial polymerization of an imaged portion and to form at least one non-imaged portion of the core composition. For example, a photomask may be used. In this process, a photomask is lowered to a predetermined level above the core composition layer, usually less than about 20 µm above the core composition layer, and more usually from about 5 µm to about 20 µm above the core composition layer. The distance of the mask to the surface of the core composition layer may be controlled by, for example, using spacers such as thin wires of the desired thickness. Exposure through the photomask with sufficient actinic radiation to partially cure the core composition to a level below full cure and above its gel point yields areas of exposed, partially polymerized core, and unexposed liquid core composition. Alternatively, the core composition may be imaged by writing with a well-defined beam of actinic radiation, such as that generated by a laser. Regardless of the method of exposure, the unexposed core composition may be developed by rinsing with a suitable solvent, leaving the exposed, partially polymerized patterned core 8. The patterned core may define, for example, waveguide structures with a rectangular or square cross-section. Then, a photosensitive overclad composition 10 is applied to the surface 9 of the core by spin coating. The overclad composition coats the top and sides of the patterned core features. The overclad composition is formulated in accordance with this invention, and is formulated, as described above, to have a refractive index when cured of about 0.3% to about 1.5% lower than that of the core material. The structure is exposed to sufficient actinic radiation to completely cure the film. Finally, the structure may thermally annealed to ensure complete polymerization of all layers and remove any residual volatile substances. Since the polymerization process is less sensitive to oxygen, the polymeric materials will be exhibit a higher degree of cure relative to prior highly fluorinated acrylate compositions, which will improve adhesion of metal to the polymer surface, adhesion of the polymer to the substrate, and thermal stability.

Figure 3:
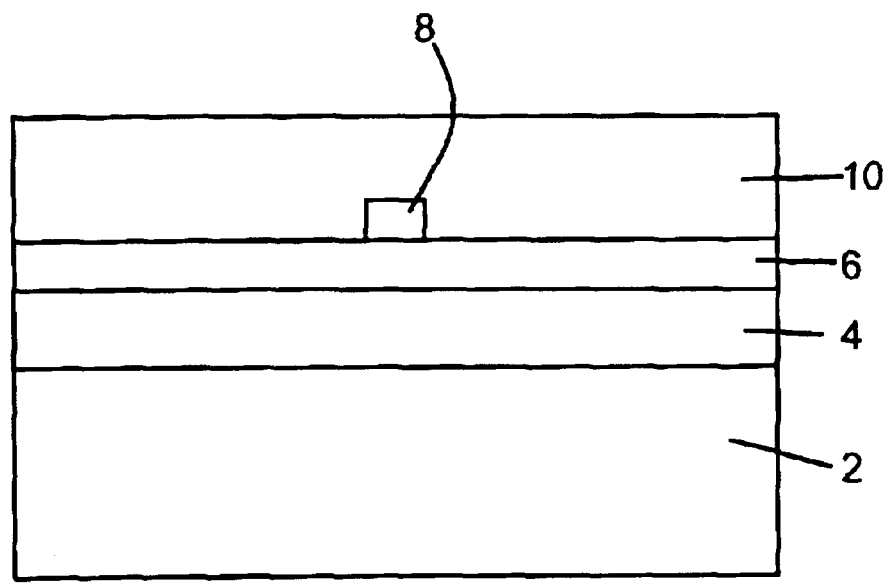
FIG. 3 is a cross-sectional view of an optical waveguide.

A cross-sectional view of an example of a waveguide structure in accordance with the present invention appears in FIG. 3. The structure includes a polymeric patterned core 8 including a polymeric composition including thioether moieties in a concentration of at least 0.05 M and at least one at least partially halogenated moiety. The polymeric patterned core is contiguous on at least one side with a polymeric clad layer 6, and contiguous on at least one side with a polymeric overclad layer 10. The clad layer is disposed above a substrate 2. The clad layer either rests directly on the substrate, or rests upon a buffer layer 4 that rests upon the substrate. The skilled artisan will appreciate that the many alternative art-recognized waveguide structures that can be made using the compositions and polymers disclosed herein are contemplated within the scope of this invention.

As will be appreciated by a person of skill in the art, the thicknesses and refractive indices of the layers are critical to waveguide device performance. The refractive indices of the layers may be defined by judicious formulation of high and low refractive thiol and ethylenically unsaturated compounds. Usually, the refractive index of the core is in the range of from about 1.33 to about 1.7, or more desirably from about 1.4 to about 1.55. The refractive index of the polymeric materials of the present invention will be higher than that of the analogous polymers made by addition of carbon-carbon double bonds (e.g. acrylates) due to the presence of sulfur. The refractive indices of the buffer, clad, and overclad layers should be lower than that of the core, as described above. Thicknesses of the layers are determined in the spin coating step by spin speed and duration and by the viscosity of the energy curable composition. The height of the waveguides of the core layer is defined by the spin coating step, while the width of the waveguides is determined by the dimensions of the features of the photomask. The dimensions and refractive indices of the layers are chosen by known methodologies to lend the desired waveguiding properties to the final device. In an embodiment of the invention, a single mode waveguide has core cross-sectional dimensions of about 7 µm by 7 µm, core refractive index at 1550 nm of about 1.336, underclad thickness of about 2 µm, underclad refractive index at 1550 nm of about 1.329, buffer thickness of about 10 µm, buffer refractive index at 1550 nm of about 1.313, overclad thickness of about 12 µm, and overclad refractive index at 1550 nm of about 1.329.

In order to produce waveguides having low loss and low polarization dependence, planar optical waveguides preferably have a polymeric core having a glass transition temperature of about 50° C. or less, and more desirably about 0° C. or less. Desired photosensitive core compositions produce upon at least partial polymerization a polymeric core having a glass transition temperature of about 50° C. or less, and more desirably about 0° C. or less. Desired planar optical waveguides have a polymeric clad and overclad having a glass transition temperature of about 40° C. or less. Desired photosensitive clad compositions and overclad compositions produce upon at least partial polymerization polymeric materials having a glass transition temperature of about 40° C. or less. The particular desired polymeric glass transition temperature may be obtained by the skilled artisan by characterization and judicious formulation of the energy curable formulations from which the polymeric material is made. The glass transition temperature may also be controlled by varying the irradiation exposure time and temperatures at which polymerization is conducted.

Suitable polymer optical elements have low optical loss in both the C-band and the L-band. For example, desired optical elements have a polymeric core having an optical loss of less than 0.75 dB/cm at 1550 nm and less than 0.75 dB/cm at 1617 nm. Highly desired optical elements have a polymeric core having an optical loss of less than 0.5 dB/cm and at 1550 nm and less than 0.5 dB/cm at 1617 nm. As the absorption loss is related to $C_H$, the person of skill will recognize that low optical loss polymeric materials of the present invention may be made with a composition made from compounds having a low $C_H$. For example, a polymer made from compounds based on Fluorolink T, which has a $C_H$ of 18.1 M, may have an optical loss of below 0.2 dB/cm.

Polymer optical waveguides may be made by processes other than the one detailed above. For example, the photosensitive core composition may be coated directly on the surface of a substrate of lower refractive index, and exposed through a photomask and overladded as described above. Alternatively, processes such as UV embossing or reactive ion etching may be used to define the waveguide pattern.

The compositions and polymers of the present invention may also find use as a tie layer to increase adhesion of a metal electrode deposited on top of a device. For example, a tie layer composition formulated in accordance with this invention will adhere well to an underlying polyacrylate polymer layer, especially if fabricated in the fashion described above. The tie layer should be formulated to have a low refractive index so as not to perturb the guiding properties of the underlying waveguide. The thiol-ene derived tie layer can cure fully in the presence of oxygen, and thus may have a high degree of surface cure. A deposited metal layer will adhere well to the tie layer.

As the compositions and polymers of the present invention cure fully in the presence of air and have low shrinkage upon curing, they are also useful as adhesives. Low optical loss is less important in adhesives than it is in waveguide polymers, so the importance of minimizing $C_H$ is reduced.

Figure 4:
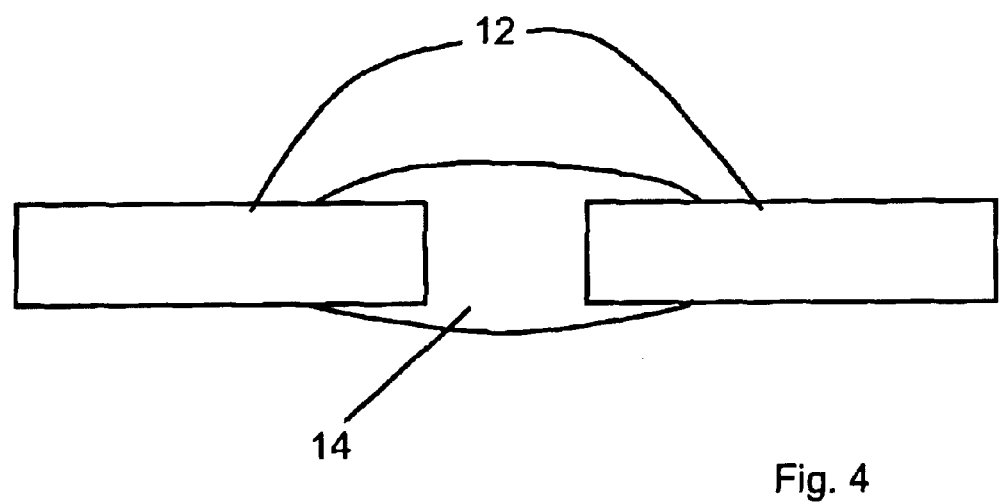
FIG. 4 is a view of two optical elements being affixed by an adhesive of the present invention.

For use in pigtailing, a refractive index between that of the optical fiber (about 1.46) and that of the polymer optical waveguide (about 1.33 to about 1.40) is desired. These refractive indices are achievable using the materials of this invention. A low index adhesive may be desired for joining other optical elements; such use is contemplated within the scope of this invention. FIG. 4 shows two elements joined by the polymer of this invention. In the inventive method of affixing a plurality of elements, an energy curable composition in accordance with this invention is provided; the elements 12 are arranged in a desired configuration; the energy curable composition 14 is applied to the area between and around the elements; and the composition is exposed to an amount of energy sufficient to at least partially polymerize the composition.

Other methods known to one of skill in the art may be used to process the materials disclosed herein. For example, a layered thin film structure may be fabricated by repeated spin/cure steps. Monolithic elements may be made by casting into a mold followed by curing. UV embossing may be used to fabricate thin films with surface detail.

The following non-limiting examples serve to illustrate the invention. It will be appreciated that variations in proportions and alternatives in elements of the components of the energy curable compositions and in material processing methods will be apparent to those skilled in the art and are within the scope of the present invention.

EXAMPLES

To formulate the energy curable compositions, the thiol compound and the ethylenically unsaturated compound is available as Fluorolink T from Ausimont USA, Inc., of Thorofare, N.J. Fluorinated alkanediols such as 2,2,3,3,4,4,5,5-octafluorohexane-1,6-diol are available from Lancaster Synthesis, Inc., of Windham, N.H. Thiol compounds for use in this invention may be purchased commercially. Desirable fluorinated thiol compounds may be synthesized by methods familiar to those in the art. For example, fluorinated polyols may be exhaustively esterified with 3-mercaptopropionic acid. Alternatively, fluorinated polyols may be converted to the corresponding polybromide, then reacted exhaustively with thiourea and saponified to give the corresponding polyfunctional thiol compound. As the person of skill in the art will recognize, suitable non-halogenated thiol compounds and ethylenically unsaturated compounds are commercially available, or may be synthesized by known methods.

If the ethylenically unsaturated compounds or the thiol compounds are synthesized from polyols, care should be taken to remove as much as practicable any residual alcohols and amines or other —OH or —NH bearing impurities, as O—H and N—H bonds absorb strongly in the 1550 nm wavelength range that is commonly used in telecommunications applications. A suitable product purification technique is described in connection with Example A.

Example A

A glass three-neck flask was fitted with a condenser and stirrer. Fluorolink T brand fluorinated polyol (900 g) and p-methoxyphenol (0.5 g) were added to the flask. The fluorinated polyol used in this example can be described as having the structure:

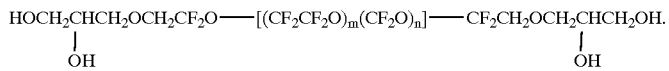

were mixed with the initiator and any other additives and well stirred. To make the polymers, the energy curable compositions were coated into thin liquid films by spin coating, slot coating, or direct liquid casting with appropriate spacers. The thickness of the film was controlled by spinning speed or spacer thickness. The thickness of films below 50 μm was measured with a Sloan Dektak IIA profilometer, and the thickness of films above 50 μm was measured with a microscope.

Some halogenated ethylenically unsaturated compounds for use in this invention are commercially available. For example, as described above, certain perfluoropolyether acrylates are available from 3M Specialty Chemicals Division, St. Paul, Minn.

Alternatively, the fluorinated ethylenically unsaturated compounds useful in this invention can be made from the commercially available fluorinated polyols using methods generally known to those skilled in the art. The tetrafunctional polyol where the ratio of m:n varies from about 0.5:1 to 1.4:1, m varies from about 6.45 to about 18.34 on average, and n varies from about 5.94 to about 13.93 on average. Desirable materials have a ratio of m:n of about 1, an average m and an average n of about 10.3.

Acryloyl chloride (170 g) was added, and the mixture was vigorously stirred. The resulting exotherm brought the temperature up to 70° C. The temperature of the reaction mixture was then raised to 90° C. and the mixture was stirred for three hours. The system was then placed under vacuum to remove the hydrogen chloride generated by the reaction and the excess acryloyl chloride. The mixture was cooled to room temperature. An infrared spectrum of the material confirmed the disappearance of the broad absorbance at 3500 cm$^{-1}$, which is attributed to hydroxyl groups on the polyol. Triethylamine (124 g) was slowly added to the reaction flask over a half hour period. The material was filtered to remove the triethylamine hydrochloride, which formed, then washed twice with water. The resulting tetraacrylate has been named UV-T and can be described as having the structure

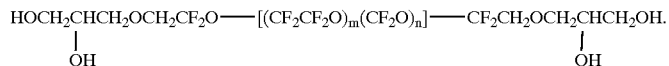

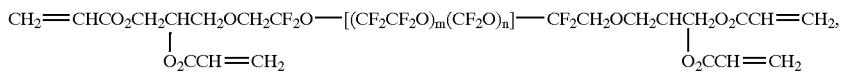

where the ratio of m:n varies from about 0.5:1 to 1.4:1, m varies from about 6.45 to about 18.34 on average, and n varies from about 5.94 to about 13.93 on average. Desirable materials have a ratio of m:n of about 1, an average m and an average n of about 10.3. These perfluoropolyether tetraacrylates have low refractive index and can be useful in adjusting the crosslinking density of the cured polymer to vary its physical properties. High molecular weight versions of this material can be very low in loss. One example of a perfluoropolyether tetraacrylate has a molecular weight of 2400 g/mol, a liquid refractive index of 1.3362, a cured homopolymer refractive index of 1.335, a liquid density of 1.663 g/mL, and a $C_H$ of about 18 M.

Example B

A three-neck glass flask was fitted with a condenser. The diol 2,2,3,3,4,4,5,5-octafluorohexane-1,6-diol (300 g) and p-methoxyphenol (0.5 g) were added to the flask. The flask was heated to 70° C. to melt the diol. Acryloyl chloride (228 g) was added, and the mixture was vigorously stirred. The resulting exotherm raised the temperature of the mixture to 90° C. The temperature was held at 90° C., and the mixture was stirred for three hours. The system was then placed under vacuum to remove the hydrogen chloride generated by the reaction and the excess acryloyl chloride. The mixture was cooled to room temperature. An infrared spectrum of the material confirmed the disappearance of the broad absorbance at 3500 cm$^{-1}$, which is attributed to hydroxyl groups on the polyol. Triethylamine (124 g) was slowly added to the reaction flask over a ½ hour period. The material was filtered to remove the triethylamine hydrochloride which formed, then washed twice with water. The remaining water was then removed under vacuum. The resulting acrylate, 2,2,3,3,4,4, 5,5-octafluorohexane-1,6-diyl diacrylate, has been named UV-8. This acrylate has a molecular weight of 370 g/mol, a liquid refractive index of 1.42, a cured homopolymer refractive index of 1.418, a liquid density of 1.433 g/mL, and a $C_H$ of about 32.1 M.

Example C

A 250 mL three-neck flask was equipped with a dropping funnel and a mechanical stirrer. Fluorolink T (104 g) was added, followed by allylchloroformate (26 g). The mixture was stirred and cooled to 5° C. with an ice bath. Triethylamine (25.5 g) was added dropwise, with the temperature being kept below 20° C. After the addition was complete, the reaction mixture was allowed to stir for an additional hour. The mixture was washed three times with methanol. Residual solvent was removed by rotary evaporation. The resulting tetraallyl perfluoropolyether has been named A-T, and can be described as having the structure

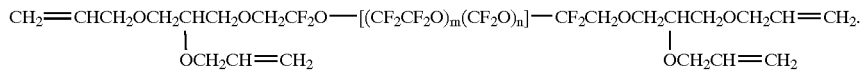

where the ratio of m:n varies from about 0.5:1 to 1.4:1, m varies from about 6.45 to about 18.34 on average, and n varies from about 5.94 to about 13.93 on average. Desirable materials have a ratio of m:n of about 1, an average m and an average n of about 10.3. This material had an absorbance of 0.060 cm$^{-1}$ at 1500 nm, and a $C_H$ of about 18 M.

Example D

A three-neck flask was equipped with a Dean-Stark condenser and a magnetic stirrer. To the flask was added Fluorolink T (82 g) and 3-mercaptopropionic acid. To the mixture was added one drop of polyphosphoric acid and 100 mL of toluene. The flask was heated at reflux with the water formed in the esterification reaction being collected in the Dean-Stark condenser. After two days, the mixture was cooled to room temperature and triethylamine (1 mL) was added to neutralize any unreacted acid. The mixture was washed three times with a mixture of 90 g of methanol and 10 g of water. Residual solvent was removed by rotary evaporation. The relatively high absorbance (0.085 cm$^{-1}$ at 1550 nm) of this material was attributed to incomplete esterification; infrared spectroscopy confirmed the presence of residual hydroxyl groups. This material has been named T-SH and can be described as having the structure

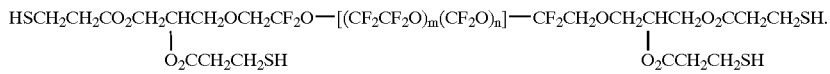

where the ratio of m:n varies from about 0.5:1 to 1.4: 1, m varies from about 6.45 to about 18.34 on average, and n varies from about 5.94 to about 13.93 on average. Desirable materials have a ratio of m:n of about 1, an average m and an average n of about 10.3. The material made from a Fluorolink T having a molecular weight of 2400 g/mol has a CH of about 17 M.

Example E

In a 250 mL flask, 70 g of Fluorolink D10, a perfluoropolyether diol with a molecular weight of 2000 g/mol, available from Ausimont USA, are combined with 8 g of triethylamine and 100 mL of 1,1,1-trichlorotrifluoroethane. Over a period of 2 hours, 24 g of nonafluoro-1-butanesulfonyl fluoride is added at room temperature. After 12 hours, 150 mL of water is introduced, and the heavy organic phase is dried in vacuo to yield the bis(nonafluoro-1-butanesulfonate) of Fluorolink D10.

A 17 g sample of the bis(nonafluoro-1-butanesulfonate) of Fluorolink D10 is dispersed in 20 mL of isopropanol, 1.2 g of thiourea is added to the reaction mass, and the temperature is raised to 80° C. under an inert atmosphere. The reaction may be monitored by infrared spectroscopy or $^{19}$F NMR. After about 15 hours, conversion of the bis (nonafluoro-1-butanesulfonate) to the corresponding bis (isothiouronium salt) is complete. The solvent is eliminated by distillation, yielding the bis(isothiouronium salt) of Fluorolink D10.

A 2.6 g sample of the bis(isothiouronium salt) of Fluorolink D10 is dissolved in 10 mL of ethanol under nitrogen and treated with 2.5 mL of 10% aqueous NaOH. The mass is allowed to react at 25° C. for four hours, then 10 mL of 5% aqueous HCl is introduced. The dithiol of Fluorolink D10 is isolated by extraction with 1,1,1-trichlorotrifluoroethane, and has the structure HSCH$_2$CF$_2$O—[(CF$_2$CF$_2$O)$_m$(CF$_2$O)$_n$]—CF$_2$CH$_2$SH. This compound has a $C_H$ value of about 11 M.

Example F

A mixture of UV-8 (99% by weight) and Darocur 1173 (1% by weight) was deposited as a 5 mm thick film on a glass substrate and polymerized with a UV lamp in the presence of air to give a polyacrylate film. A mixture of UV-8 (51% by weight), trimethylolpropane tris(3-mercaptopropionate) (48% by weight), and Darocur 1173 (1% by weight) was deposited as a 5 mm thick film on a glass substrate and polymerized by a UV lamp in the presence of air to give a thiol-ene derived film. FIG. 5 shows the absorbance spectrum of the thiol compound trimethylolpropane tris(3-mercaptopropionate), and FIG. 6 shows the absorbance spectra of the two films with the glass removed. The thiol compound has a relatively high loss due to C—H bond absorption, but has no sharp transitions in the C-band or the L-band. As the trimethylolpropane tris(3-mercaptopropionate) has a high concentration of carbon-hydrogen bonds, the thiol-ene derived film has a higher absorbance in the C-band (wavelengths of about 1530 nm to about 1560 nm) than does the polyacrylate film. However, the polyacrylate film shows an absorption band at about 1617 nm, which is attributed to an overtone of a C—H stretch on unreacted carbon-carbon double bonds. The thiol-ene derived film has no sharp peak at about 1617 nm, suggesting that the carbon-carbon double bonds are substantially completely reacted in the thiol-ene polymerization reaction.

The thiol-ene composition of this example has a ratio of thiol moieties to ethylenically unsaturated moieties of 1.31:1. The cured polymer has a fundamental repeat unit of

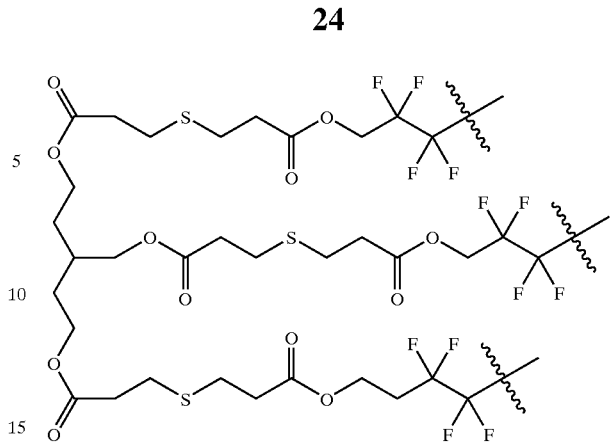

Assuming 100% cure and a polymer density of 1.5 g/mL, the thioether concentration of this material can be calculated to be 3.5 M. This material has a calculated $C_H$ of 51.2 M.

Thick slabs of the two energy curable compositions were cured by UV radiation. The polyacrylate slab cracked and showed substantial shrinkage. The thiol-ene derived slab did not crack, and exhibited substantially less shrinkage than the polyacrylate film. Further, the thiol-ene derived material was softer and more flexible than the polyacrylate material.

Example G

An equimolar mixture of UV-T and T-SH with 1% by weight of Darocur 1173 was cured to a polymer with UV radiation in the presence of air. UV-T alone with 1% by weight of Darocur 1173 did not cure in the presence of air. The thiol-ene derived material has a fundamental repeat unit constructed from one molecule each of UV-T and T-SH with four thioether bonds. Assuming a polymer density of 1.7 g/mL, molecular weights of UV-T and T-SH of 2400 g/mol, and an 80% degree of cure, the thioether concentration is calculated to be about 1.1 M. The $C_H$ of this material is calculated to be about 18 M.

Example H

An equimolar mixture of A-T and T-SH with 1% by weight of Darocur 1173 was cured to a polymer with UV radiation in the presence of air. Assuming a polymer density of 1.7 g/mL, molecular weights of UV-T and T-SH of 2400 g/mol, and an 80% degree of cure, the thioether concentration is calculated to be about 1.1 M. The $C_H$ of this material is calculated to be about 18 M.

Example I

A mixture of T-SH, UV-T, and A-T (1:0.5:0.5 mole ratio) with 1% by weight of Darocur 1173 was cured to a polymer with UV radiation in the presence of air. Assuming a polymer density of 1.7 g/mL, molecular weights of UV-T and T-SH of 2400 g/mol, and an 80% degree of cure, the thioether concentration is calculated to be about 1.1 M. The $C_H$ of this material is calculated to be about 18 M.

Example J

An 1:2 mole ratio mixture of T-SH and FAVE 4101 with 1% by weight of Darocur 1173 was cured to a polymer with UV radiation in the presence of air in 30 seconds using an Oriel model 8113 UV curing unit, which has an intensity of 10 mW/cm$^2$. As T-SH is tetrafunctional, and FAVE 4101 is difunctional, this mixture had a thiol:vinyl ratio of 1:1. A sample of FAVE 4101 mixed 1% by weight of Daracure 1173 remained liquid even after 900 seconds in the same curing unit in either the presence of air or when nitrogen blanketed. This material has a thioether concentration of about 1.5 M, and a $C_H$ of about 42 M.

Example K

A suitable perfluoropolyether diisocyanate, poly (tetrafluoroethylene oxide-co-difluoromethylene oxide) alpha, omega-diisocyanate, was purchased from Sigma-Aldrich, Milwaukee, Wis.

The perfluoropolyether bis(isocyanate) described above was heated with 2.2 equivalents of 1,3-dimercapto-2-propanol in 1:1 ethyl perfluorobutyl ether/ dimethylformamide with catalytic dibutyltin dilaurate at reflux for four hours. The reaction was followed by monitoring the disappearance of the isocyanate stretching band and the growth of the carbonyl band by FTIR. Upon completion of the reaction mixture was washed well with water. Concentration by evaporation yielded the perfluoropolyether bis(urethane dithiol), which has the putative formula:

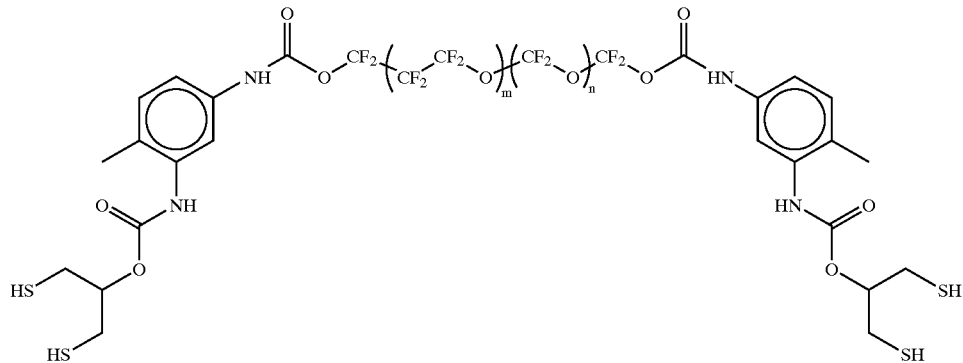

Example L 2-hydroxy-1-[4-(hydroxyethoxy)phenyl]-2-methyl-1-propanone was allowed to react with 1.1 equivalents of perfluorobutyric anhydride at reflux in tetrahydrofuran for 16 hours. The reaction mixture was poured into water and, and the resulting mixture extracted with ethyl perfluorobutyl ether. The solvent was evaporated under reduced pressure to yield 2-hydroxy-1-[4-(2-heptafluorobutyroxyethoxy) phenyl]-2-methyl-1-propanone.

Example M

An adhesive composition was formulated with 1.0 g of UV-T, 0.8 g. of T-SH, 0.15 g of the perfluoropolyether bis(urethane dithiol) of Example K, 0.05 g of 2-hydroxy-1-[4-(2-heptafluorobutyroxyethoxy)phenyl]-2-methyl-1-propanone, 0.03 g of (3-methacryloxypropyl) trimethoxysilane, and 0.03 g of (3-glycidyloxypropyl)-trimethoxysilane. The composition has a refractive index of 1.34 at 1.55 □m. The adhesive composition was used to pigtail an optical fiber to a low index fluoropolymer waveguide. The adhesive was of an appropriate viscosity, and cured well in air. The pigtail interface exhibited a return loss of about −52 dB.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical element comprising a polymeric core including a polymeric material including thioether moieties in a concentration of at least 0.05 M and at least one at least partially halogenated moiety; wherein the optical element comprises a polymeric overclad layer;

a polymeric cladding layer; and a substrate wherein the polymeric core is contiguous on at least one side with the polymeric overclad layer, and contiguous on at least one side with the polymeric cladding layer; and the polymeric cladding layer is between the polymeric core and the substrate wherein the halogenated moiety is selected from the group consisting of —(CF$_2$)$_x$—,

—(CF$_3$)$_2$C—,

—CF$_2$O—[(CF$_2$CF$_2$O)$_m$(CF$_2$O)$_n$]—CF$_2$—,

—CF(CF$_3$)O(CF2)$_4$O[CF(CF$_3$)CF$_2$O]$_p$CF(CF$_3$)—, and

—CF$_2$O—(CF$_2$CF$_2$O)$_m$—CF$_2$—, wherein x is an integer between 1 and about 10;

m and n designate the number of randomly distributed perfluoroethyleneoxy and perfluoromethyleneoxy backbone repeating subunits, respectively; and p designates the number of —CF(CF$_3$)CF$_2$O— backbone repeating subunits.

2. An optical element comprising a polymeric core including a polymeric material including thioether moieties in a concentration of at least 0.05 M and at least one at least partially halogenated moiety wherein the polymeric material is produced from a energy curable composition comprising the compound

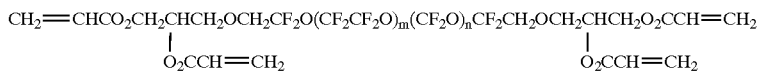
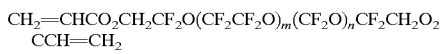

wherein m and n designate the number of randomly distributed perfluoroethyleneoxy and perfluoromethyleneoxy backbone repeating subunits, respectively, and the ratio of m:n is between about 0.5:1 and about 1.4:1.

3. An optical element comprising a polymeric core including a polymeric material including thioether moieties in a concentration of at least 0.05 M and at least one at least partially halogenated moiety wherein the polymeric material is produced from an energy curable composition comprising the compound $$CH_2=CHCO_2CH_2CF_2O(CF_2CF_2O)_m(CF_2O)_nCF_2CH_2O_2CCH=CH_2$$

wherein m and n designate the number of randomly distributed perfluoroethyleneoxy and perfluoromethyleneoxy backbone repeating subunits, respectively, and the ratio of m:n is between about 0.5:1 and about 1.4:1.

4. The optical element of claim 1 wherein the polymeric core exhibits an optical loss of less than 0.75 dB/cm at 1550 nm and less than 0.75 dB/cm at 1617 nm.

5. The optical element of claim 1 wherein the polymeric core exhibits an optical loss of less than 0.5 dB/cm at 1550 nm and less than 0.5 dB/cm at 1617 nm.

6. The optical element of claim 1 wherein the glass transition temperature of the polymeric overclad layer and the polymeric clad layer is about 40° C. or less and the glass transition temperature of the polymeric core is about 50° C. or less.

7. The optical element of claim 1 wherein the glass transition temperature of the polymeric core is less than 0° C.

8. The optical element of claim 1 wherein the polymeric overclad layer and the polymeric clad layer include a polymeric material including thioether moieties in a concentration of at least 0.05 M and at least one at least partially halogenated moiety.

9. A method of making an optical element comprising the steps of:
(a) applying a layer of a clad composition to a substrate, the clad composition including an at least difunctional thiol compound, an at least difunctional ethylenically unsaturated compound, and a selected amount of a free radical initiator
wherein at least one of the thiol compound and the ethylenically unsaturated compound is at least partially halogenated,
the ratio of thiol moieties to isolated ethylenically unsaturated moieties is between about 1:2 and about 2:1 and
the ethylenically unsaturated compound account for between about 35% and about 99.9% of the cladding composition;
(b) at least partially curing the cladding composition to form a polymeric cladding layer;
(c) applying a photosensitive core composition to the surface of the polymeric cladding layer to form a core composition layer, the core composition including an at least difunctional thiol compound, an at least difunctional ethylenically unsaturated compound, and a selected amount of a free radical initiator
wherein at least one of the thiol compound and the ethylenically unsaturated compound is at least partially halogenated,
the ratio of thiol moieties to isolated ethylenically unsaturated moieties is between about 1:2 and about 2:1 and
the ethylenically unsaturated compound accounts for between about 35% and about 99.9% of the core composition;
(d) imagewise exposing the photosensitive core composition layer to sufficient actinic radiation to effect the at least partial polymerization of an imaged portion and to form at least one non-imaged portion of the photosensitive core composition layer;
(e) removing the at least one non-imaged portion without removing the imaged portion, thereby forming a polymeric patterned core from the imaged portion;
(f) applying a photosensitive overclad composition onto the polymeric patterned core; and
(g) at least partially curing the overclad composition to form a polymeric overclad layer,
wherein the polymeric overclad layer and the polymeric cladding layer have a lower refractive index than the polymeric patterned core.

10. The method of claim 9 wherein the overclad composition includes an at least difunctional thiol compound, an at least difunctional ethylenically unsaturated compound, and a selected amount of a free radical initiator wherein at least one of the thiol compound and the ethylenically unsaturated compound is at least partially halogenated, the ratio of thiol moieties to isolated ethylenically unsaturated moieties is between about 1:2 and about 2:1 and the ethylenically unsaturated compound account for between about 35% and about 99.9% of the overclad composition.

* * * * *